US012592656B2

(12) United States Patent
Lin et al.

(10) Patent No.: US 12,592,656 B2
(45) Date of Patent: Mar. 31, 2026

(54) SENSORLESS MOTOR CIRCUIT PROVIDING ACCURATE BACK ELECTROMOTIVE FORCE ZERO-CROSSING POINT DETECTION AND OPERATION METHOD THEREOF

(71) Applicant: Artery Technology Company, Hsinchu City (TW)

(72) Inventors: Ming-Tsan Lin, Keelung City (TW); Zi-Xuan Huang, Nantou County (TW); Yi-Shiang Ouyang, Miaoli County (TW)

(73) Assignee: ARTERY TECHNOLOGY COMPANY, Hsinchu City (TW)

( * ) Notice: Subject to any disclaimer, the term of this patent is extended or adjusted under 35 U.S.C. 154(b) by 254 days.

(21) Appl. No.: 18/636,177

(22) Filed: Apr. 15, 2024

(65) Prior Publication Data

US 2025/0226775 A1 Jul. 10, 2025

(30) Foreign Application Priority Data

Jan. 10, 2024 (TW) ................................. 113100984

(51) Int. Cl.
*H02P 6/18* (2016.01)
*H02P 6/15* (2016.01)
(Continued)

(52) U.S. Cl.
CPC .............. *H02P 6/182* (2013.01); *H02P 6/157* (2016.02); *H02P 7/29* (2013.01)

(58) Field of Classification Search
CPC ............. H02P 6/182; H02P 6/157; H02P 7/29
See application file for complete search history.

(56) References Cited

U.S. PATENT DOCUMENTS

| | | | | |
|---|---|---|---|---|
| 2004/0080293 A1* | 4/2004 | Kurosawa | ............... | H02P 6/182 |
| | | | | 318/400.11 |
| 2008/0238349 A1* | 10/2008 | Cheng | ....................... | H02P 6/16 |
| | | | | 318/400.35 |
| 2022/0103100 A1* | 3/2022 | Narumi | ................... | H02P 6/182 |

FOREIGN PATENT DOCUMENTS

CN 101026351 A 8/2007

OTHER PUBLICATIONS

Office Action issued by TIPO dated Oct. 11, 2024 for TW113100984.
English Abstract of CN101026351.

* cited by examiner

*Primary Examiner* — Muhammad S Islam

(74) *Attorney, Agent, or Firm* — WPAT, P.C.; Anthony King

(57) ABSTRACT

A sensorless motor circuit includes a brushless direct current motor, a driving circuit, a voltage adjustment circuit, a virtual neutral circuit, a comparator and a control circuit. The brushless direct current motor includes the first to third windings. The driving circuit outputs a PWM voltage to the first winding, couples the second winding to a ground terminal, and floats the third winding. The voltage adjustment circuit outputs a divided voltage according to a terminal voltage of the third winding. The virtual neutral circuit generates a virtual neutral voltage. The comparator compares the divided voltage with the virtual neutral voltage to generate a comparison signal. The control circuits determine a sampling time according to a duty cycle of the PWM voltage, and samples the comparison signal at the sampling time to detect a back electromotive force zero-crossing event, so as to perform commutation.

16 Claims, 7 Drawing Sheets

(51) Int. Cl.
H02P 6/182 (2016.01)
H02P 7/29 (2016.01)

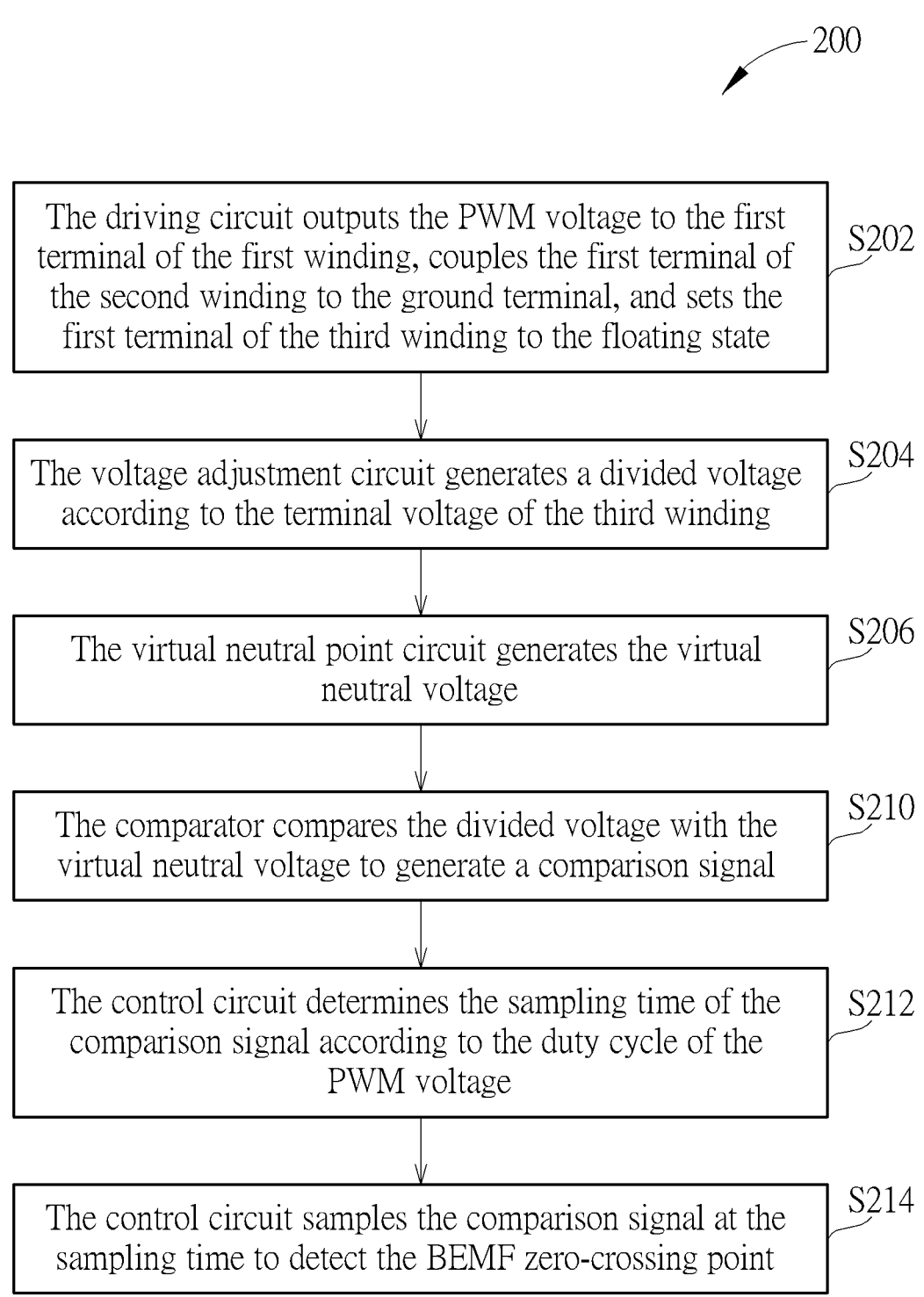

200

The driving circuit outputs the PWM voltage to the first terminal of the first winding, couples the first terminal of the second winding to the ground terminal, and sets the first terminal of the third winding to the floating state — S202

The voltage adjustment circuit generates a divided voltage according to the terminal voltage of the third winding — S204

The virtual neutral point circuit generates the virtual neutral voltage — S206

The comparator compares the divided voltage with the virtual neutral voltage to generate a comparison signal — S210

The control circuit determines the sampling time of the comparison signal according to the duty cycle of the PWM voltage — S212

The control circuit samples the comparison signal at the sampling time to detect the BEMF zero-crossing point — S214

FIG. 2

SENSORLESS MOTOR CIRCUIT PROVIDING ACCURATE BACK ELECTROMOTIVE FORCE ZERO-CROSSING POINT DETECTION AND OPERATION METHOD THEREOF

BACKGROUND OF THE INVENTION

1. Field of the Invention

The invention relates to motor circuits, and specifically, to a sensorless motor circuit providing accurate back electromotive force zero-crossing point detection and an operation method thereof.

2. Description of the Prior Art

Brushless direct current (BLDC) motors are widely used in various applications such as robots, computer equipment, medical equipment, automotive applications, pump devices, home appliances, and others. Compared to the conventional brushed motors, the BLDC motors have improved efficiency, require less maintenance (no carbon brush wearing), and may achieve a flat torque curve across all rated speeds.

The common BLDC motors employ a three-phase configuration. Since the rotor of the BLDC motor is driven by the rotating magnetic field of the stator winding, the position of the rotor must be tracked to effectively drive the rotor. The motor system may track the rotor position according to the zero-crossing points of the back electromotive force voltage of the BLDC motor. In the related art, a filter is used to filter out the noise in the back electromotive force voltage. However, the filter will affect the phase of the back electromotive force voltage, reducing the accuracy of detection of the BEMF zero-crossing point.

SUMMARY OF THE INVENTION

According to an embodiment of the invention, a sensorless motor circuit includes a brushless direct current (BLDC) motor, a driving circuit, a voltage adjustment circuit, a virtual neutral point circuit, a comparator, and a control circuit. The BLDC motor includes a first winding, a second winding and a third winding, each of the first winding, the second winding and the third winding including a first terminal having a terminal voltage, and a second terminal. The driving circuit is coupled to the BLDC motor, and is used to output a pulse width modulation (PWM) signal to a first terminal of the first winding, couple a first terminal of the second winding to a ground terminal, and set a first terminal of the third winding to a floating state. The voltage adjustment circuit is coupled to the first terminal of the third winding, and is used to generate a divided voltage according to a terminal voltage of the third winding. The virtual neutral point circuit is coupled to the first terminal of the first winding, the first terminal of the second winding and the first terminal of the third winding, and is used to generate a virtual neutral voltage. The comparator is coupled to the voltage adjustment circuit and directly coupled to the virtual neutral point circuit, and is used to compare the divided voltage with the virtual neutral voltage to generate a comparison signal. The control circuit is directly coupled to the comparator, and is used to determine a sampling time of the comparison signal according to a duty cycle of the pulse width modulation signal, and sample the comparison signal at the sampling time to detect a back electromotive force (BEMF) zero-crossing point.

According to another embodiment of the invention, a sensorless motor circuit includes a BLDC motor, a driving circuit, a voltage adjustment circuit, a virtual neutral point circuit, a comparator and a control circuit. The BLDC motor includes a first winding, a second winding and a third winding, each of the second winding and the third winding comprising a first terminal having a terminal voltage, and a second terminal. The driving circuit is coupled to the BLDC motor, the voltage adjustment circuit is coupled to a first terminal of the third winding, and the virtual neutral point circuit is coupled to a first terminal of the first winding, a first terminal of the second winding and a first terminal of the third winding, the comparator is coupled to the voltage adjustment circuit and directly coupled to the virtual neutral point circuit, the control circuit is directly coupled to the comparator. A method of operating the sensorless motor circuit includes the driving circuit outputting a PWM signal to a first terminal of the first winding, coupling a first terminal of the second winding to a ground terminal, and setting the first terminal of the third winding to a floating state, the voltage adjustment circuit generating a divided voltage according to a terminal voltage of the third winding, the virtual neutral point circuit generating a virtual neutral voltage, the comparator comparing the divided voltage with the virtual neutral voltage to generate a comparison signal, the control circuit determining a sampling time of the comparison signal according to a duty cycle of the PWM signal, and the control circuit sampling the comparison signal at the sampling time to detect a EBMF zero-crossing point.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 2 is a flowchart of a method of operating the sensorless motor circuit in FIG. 1.

DETAILED DESCRIPTION

Figure 1:
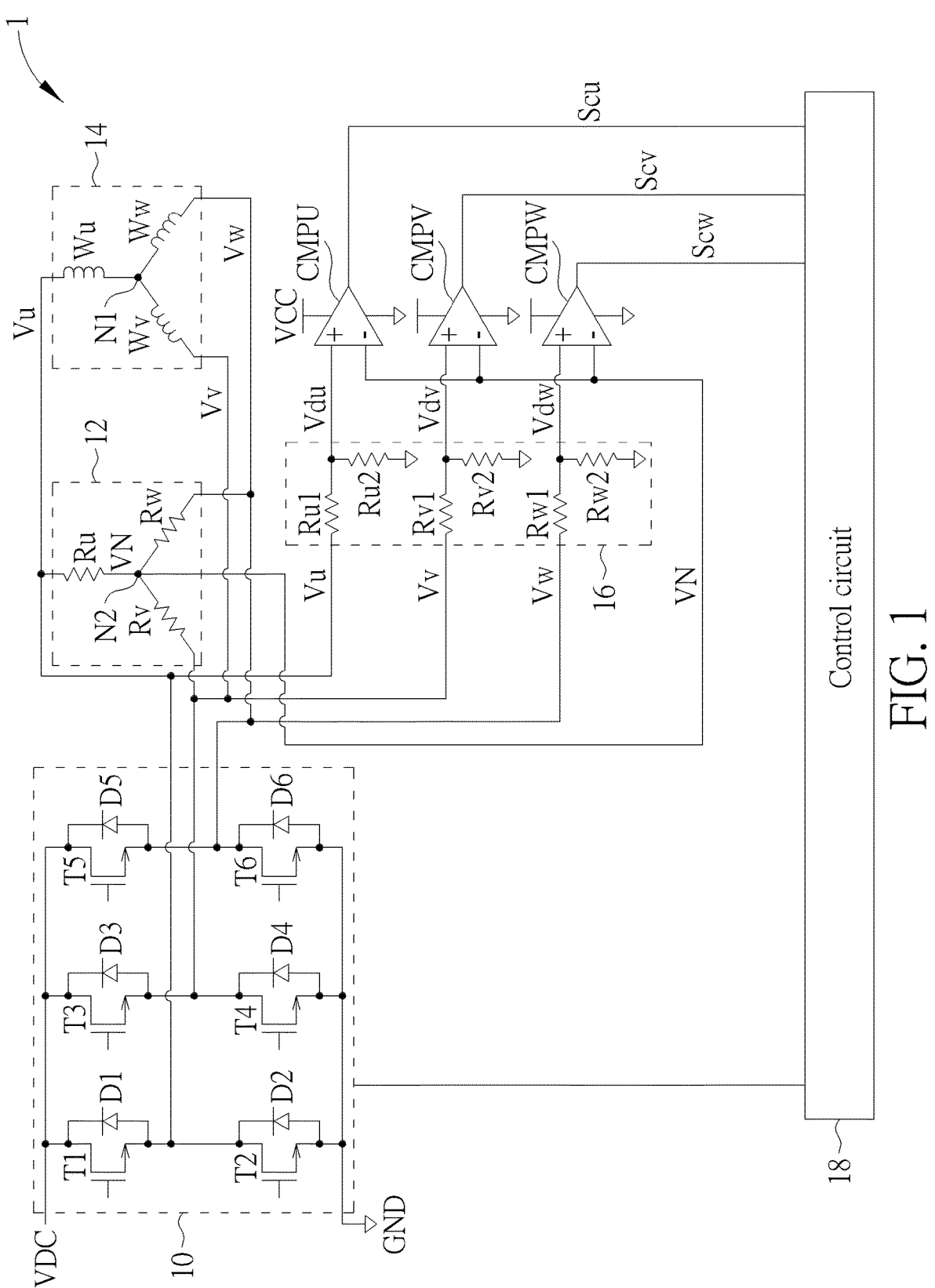
FIG. 1 is a schematic diagram of a sensorless motor circuit according to an embodiment of the invention.

FIG. 1 is a schematic diagram of a sensorless motor circuit 1 according to an embodiment of the invention. The motor circuit 1 may include a driving circuit 10, a virtual neutral point circuit 12, a brushless direct current (BLDC) motor 14, a voltage adjustment circuit 16, comparators CMPU, CMPV and CMPW, and a control circuit 18. The driving circuit 10 may be coupled to the virtual neutral point circuit 12 and the BLDC motor 14, the BLDC motor 14 may be directly coupled to the voltage adjustment circuit 16, the voltage adjustment circuit 16 and virtual neutral point circuit 12 may be coupled directly the comparators CMPU, CMPV and CMPW, and the comparators CMPU, CMPV and CMPW and the driving circuit 10 may be coupled to the control circuit 18. The voltage adjustment circuit 16 may sampling a back electromotive force (BEMF) voltage of the BLDC motor 14 after the BEMF voltage has stabilized, so as to detect a back electromotive force (BEMF) zero-crossing point without using a filter and perform commutation according to the BEMF zero-crossing point, preventing a filter from generating a phase delay in the detected back EMF voltage, detecting the BEMF zero-crossing point while reducing manufacturing costs.

The BLDC motor 14 may include a rotor and a stator operated in three phases (U phase, V phase, and W phase). The rotor may incorporate a permanent magnet, and may be spaced apart from the stator to allow for rotation or translation. The stator may include a yoke and windings Wu, Wv, and Ww. The yoke may be cylindrical in shape and may be arranged around the rotor. The windings Wu, Wv and Ww may be distributed around the circumference of the yoke, and the windings Wu, Wv and Ww may be coupled to each other at a neutral point N1. Specifically, the winding Wu may include a first terminal having a terminal voltage Vu; and a second terminal coupled to the neutral point N1 having a neutral voltage. Similarly, the winding Wv may include a first terminal having a terminal voltage Vv, and a second terminal coupled to the neutral point N having the neutral voltage. The winding Ww may include a first terminal having a terminal voltage Vw; and a second terminal coupled to the neutral point N1 having the neutral voltage.

The virtual neutral point circuit 12 may generate a virtual neutral voltage VN substantially equal to the neutral voltage. The virtual neutral point circuit 12 may include virtual neutral point resistors Ru, Rv, and Rw. The virtual neutral point resistors Ru, Rv, and Rw may have high resistance exceeding those of the voltage dividing resistors in the voltage adjustment circuit to prevent the load from affecting the voltage adjustment circuit 16. The virtual neutral point resistor Ru includes a first terminal coupled to the first terminal of the winding Wu, and a second terminal configured to generate the virtual neutral voltage VN. The second terminal of the virtual neutral point resistor Ru may also be referred to as the virtual neutral point N2. The virtual neutral point resistor Rv includes a first terminal coupled to the first terminal of the winding Wv, and a second terminal coupled to the second terminal of the virtual neutral point resistor Ru. The virtual neutral point resistor Rw includes a first terminal coupled to the first terminal of the winding Ww, and a second terminal coupled to the second terminal of the virtual neutral point resistor Ru.

The driving circuit 10 may receive a pulse width modulation (PWM) signal output from the control circuit 18 to generate a PWM voltage to drive the BLDC motor 14. In addition, the driving circuit 10 may excite two of the windings Wu, Wv and Ww (hereinafter referred to as the first winding and the second winding) and set the remaining one of the windings Wu, Wv and Ww (hereinafter referred to as the third winding) to a floating state in a predetermined order to form a rotating magnetic field, thereby driving the rotor to rotate. Switching the directions of the currents in the windings in the predetermined order to maintain a constant direction of the rotating magnetic field and keep the rotor rotating or translating smoothly is referred to as commutation. Specifically, the driving circuit 10 may output the PWM voltage to the first terminal of the first winding, couple the first terminal of the second winding to a ground terminal, and set the first terminal of the third winding to the floating state. The ground terminal may provide a ground voltage GND (e.g., 0V). For example, if the first winding is the winding Wu, the second winding is the winding Wv, and the third winding is the winding Ww, the driving circuit 10 may output the PWM voltage to the first terminal of the winding Wu, couple the first terminal of the winding Wv to the ground terminal, and set the first terminal of the floating winding Ww to the floating state, and thus the terminal voltage Vu may be the PWM voltage, the terminal voltage Vv may be the ground voltage GND, and the terminal voltage Vw may be the BEMF signal. When the rotor rotates, the winding Wu, the winding Wv and the winding Ww may respectively generate BEMF signals. The BEMF signals may gradually increase from a negative value to a positive value or gradually decrease from a positive value to a negative value as the rotor rotates. Since only the third winding is floating without being affected by external signals, the BEMF signal of the third winding may directly reflect the voltage difference between the first terminal and the second terminal of the third winding. When the voltage difference between the first terminal and the second terminal of the third winding is 0V, a BEMF zero-crossing point is reached.

The driving circuit 10 may include switches T1 to T6. The switches T1 to T6 may be, but not limited to, N-type metal-oxide-semiconductor field-effect transistors (MOS-FET). In some embodiments, the switches T1 to T6 may be, but are not limited to, N-type bipolar junction transistors (BJTs). The switch T1 may include a control terminal coupled to the control circuit 18, a first terminal coupled to a supply terminal, and a second terminal coupled to the first terminal of the winding Wu. The switch T2 may include a control terminal coupled to the control circuit 18, a first terminal coupled to the second terminal of the switch T1, and a second terminal coupled to the ground terminal. The switch T3 may include a control terminal coupled to the control circuit 18, a first terminal coupled to the supply terminal, and a second terminal coupled to the first terminal of the winding Wv. The switch T4 may include a control terminal coupled to the control circuit 18, a first terminal coupled to the second terminal of the switch T3, and a second terminal coupled to the ground terminal. The switch T5 may include a control terminal coupled to the control circuit 18, a first terminal coupled to the supply terminal, and a second terminal coupled to the first terminal of the winding Ww. The switch T6 may include a control terminal coupled to the control circuit 18, a first terminal coupled to the second terminal of the switch T5, and a second terminal coupled to the ground terminal. The supply terminal may provide a direct current (DC) voltage VDC such as 24V, and the ground terminal may provide a ground voltage GND such as 0V. The switches T1 to T6 may include body diodes D1 to D6, respectively.

The voltage adjustment circuit 16 may generate a divided voltage of the terminal voltage according to the terminal voltage of the third winding. In some embodiments, the voltage adjustment circuit 16 may generate divided voltages Vdu, Vdv and Vdw of the terminal voltages Vu, Vv and Vw respectively. The voltage adjustment circuit 16 may include resistors Ru1, Ru2, Rv1, Rv2, Rw1, and Rw2. The resistor Ru1 includes a first terminal configured to receive the terminal voltage Vu; and a second terminal configured to output the divided voltage Vdu. The resistor Ru2 includes a first terminal coupled to the second terminal of the resistor Ru1, and a second terminal coupled to the ground terminal. The resistor Rv1 includes a first terminal configured to receive the terminal voltage Vv; and a second terminal configured to output the divided voltage Vdv. The resistor Rv2 includes a first terminal coupled to the second terminal of the resistor Rv1, and a second terminal coupled to the ground terminal. The resistor Rw1 includes a first terminal configured to receive the terminal voltage Vw; and a second terminal configured to output the divided voltage Vdw. The resistor Rw2 includes a first terminal coupled to the second terminal of the resistor Rw1, and a second terminal coupled to the ground terminal.

Since the voltage used in the BLDC motor 14 is relatively high, the voltage adjustment circuit 16 may reduce the terminal voltage of the third winding for subsequent use. In some embodiments, the resistances of the resistors Ru1, Rv1, and Rw1 may be equal, the resistances of the resistors Ru2, Rv2, and Rw2 may be equal, and the resistance of the resistor Ru2 may be less than the resistance Ru1. For example, the resistances of the resistors Ru1, Rv1 and Rw1 may be 6.8K ohms, and the resistances of the resistors Ru2, Rv2 and Rw2 may be 1K ohms. If the terminal voltage of the third winding is 24V, the voltage adjustment circuit 16 may generate 3.08V (=24*1K/7.8K) as the divided voltages of the terminal voltages. In some embodiments, if the subsequent circuit is operated in higher voltage, the voltage adjustment circuit 16 may be omitted from the motor circuit 1.

The comparator CMPU may compare the divided voltage Vdu with the virtual neutral voltage VN to generate the comparison signal Scu, the comparator CMPV may compare the divided voltage Vdv with the virtual neutral voltage VN to generate the comparison signal Scv, and the comparator CMPW may compare the divided voltages. Vdw with the virtual neutral voltage VN to generate the comparison signal Scw. If the divided voltage Vdu exceeds the virtual neutral voltage VN, the comparator CMPU may set the comparison signal Scu to a logic high level (e.g., the supply voltage VCC); and if the divided voltage Vdu does not exceed the virtual neutral voltage VN, the comparator CMPU may set the comparison signal Scu to a logic low level (e.g., the ground voltage GND). Similarly, if the divided voltage Vdv exceeds the virtual neutral voltage VN, the comparator CMPV may set the comparison signal Scv to the logic high level; and if the divided voltage Vdv does not exceed the virtual neutral voltage VN, the comparator CMPV may set the comparison signal Scv to the logic low level. If the divided voltage Vdw exceeds the virtual neutral voltage VN, the comparator CMPW may set the comparison signal Scw to the logic high level; and if the divided voltage Vdw does not exceed the virtual neutral voltage VN, the comparator CMPW may set the comparison signal Scw to the logic low level. The comparator CMPU includes a supply terminal configured to receive the supply voltage VCC (e.g., 3.3V); a ground terminal configured to receive the ground voltage GND; a non-inverting input terminal coupled to the second terminal of the resistor Ru1 to receive the divided voltage Vdu; an inverting input terminal coupled to the virtual neutral point N2 to receive the virtual neutral voltage VN; and an output terminal configured to output the comparison signal Scu. Similarly, the comparator CMPV includes a supply terminal configured to receive the supply voltage VCC; a ground terminal configured to receive the ground voltage GND; a non-inverting input terminal coupled to the second terminal of the resistor Rv1 to receive the divided voltage Vdv; an inverting input terminal coupled to the virtual neutral point N2 to receive the virtual neutral voltage VN; and an output terminal configured to output the comparison signal Scv. The comparator CMPW includes a supply terminal configured to receive the supply voltage VCC; a ground terminal configured to receive the ground voltage GND; a non-inverting input terminal coupled to the second terminal of the resistor Rw1 to receive the divided voltage Vdw; an inverting input terminal coupled to the virtual neutral point N2 to receive the virtual neutral voltage VN; and an output terminal configured to output the comparison signal Scw.

The control circuit 18 may include a microcontroller, a microprocessor, a field programmable gate array (FPGA), or other types of control circuits. The control circuit 18 may generate control signals to respectively control switches T1 to T6, so as to control the commutation of the DC motor 14. The control circuit 18 may determine the sampling time corresponding to the comparison signal of the third winding according to the duty cycle of the PWM voltage of the first winding. For example, if the third winding is the winding Ww, the control circuit 18 may determine the sampling time of the comparison signal Scw. The sampling time may occur during the OFF duration or the ON duration of the PWM signal of the first winding.

Figure 3:
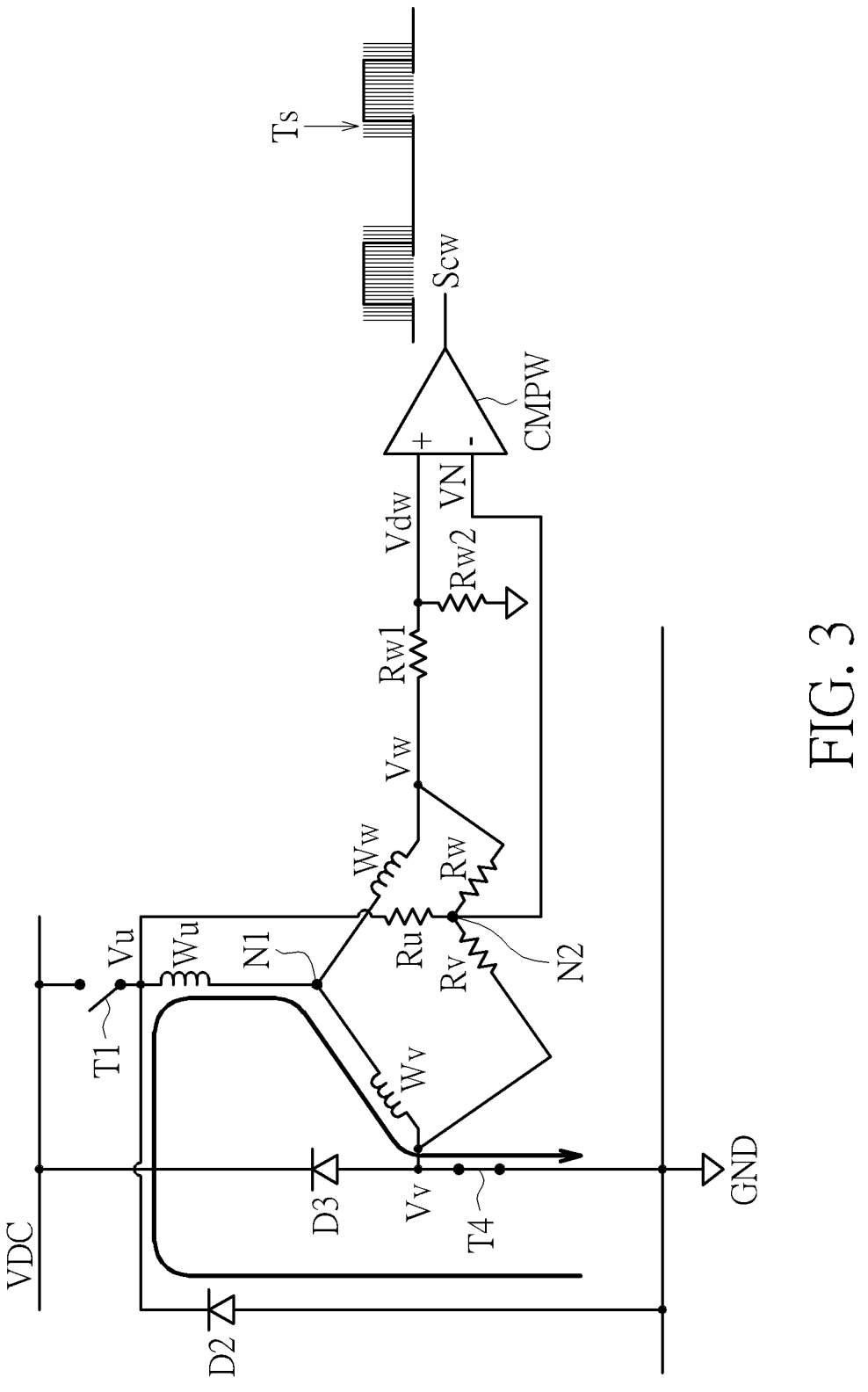
FIG. 3 is a schematic diagram illustrating sampling during the OFF duration of the PWM voltage performed by the motor circuit in FIG. 1.

In some embodiments, if the duty cycle of the PWM voltage of the first winding is less than the preset duty cycle, the control circuit 18 may determine that the sampling time occurs in the OFF duration of the PWM voltage after the PWM voltage has stabilized. The preset duty cycle may be 50%. Since noise and/or jitter may arise when the PWM voltage at the first winding toggles (e.g., the control circuit 18 switches a PWM signal from a logic high level to a logic low level), and the signal path may include parasitic elements, the BEMF signal of the third winding, the virtual neutral voltage VN and the comparison signal may generate noise and/or jitter and show instability. To address the issues of the noise and/or jitter, the control circuit 18 may perform sampling only after the comparison signal has stabilized, so as to obtain a correct sampling value and detect the EBMF zero-crossing point according to the correct sampling value. Further, since the comparison signal needs a predetermined period of time to stabilize, when the duty cycle of the PWM voltage of the first winding is less than 50% of the duty cycle, the OFF duration of the PWM voltage will be longer than the PWM voltage, and thus, the control circuit 18 may determine that the sampling time occurs in the OFF duration of the PWM voltage to ensure sufficient duration for the comparison signal to stabilize. In some embodiments, the sampling time may be the end time of the OFF duration of the PWM voltage, enabling the comparison signal to have more time to stabilize, as shown in FIG. 3. FIG. 3 is a schematic diagram illustrating sampling during the OFF duration of the PWM voltage performed by the motor circuit 1, where the first winding is the winding Wu, the second winding is the winding Wv, the third winding is the winding Ww, and the duty cycle of the PWM voltage of the winding Wv is 30%. FIG. 3 also shows a schematic diagram of the comparison signal Scw, since no filter is adopted in the motor circuit 1, the comparison signal Scw will contain unfiltered noise. Since the duty cycle of the PWM voltage is less than the preset duty cycle (30%<50%), the control circuit 18 may set a sampling time Ts of the comparison signal Scw to the end time of the OFF duration of the PWM voltage. That is, the sampling time Ts occurs just before the switch T1 switches from the OFF state to the ON state, providing sufficient time for the comparison signal Scw to stabilize.

Figure 4:
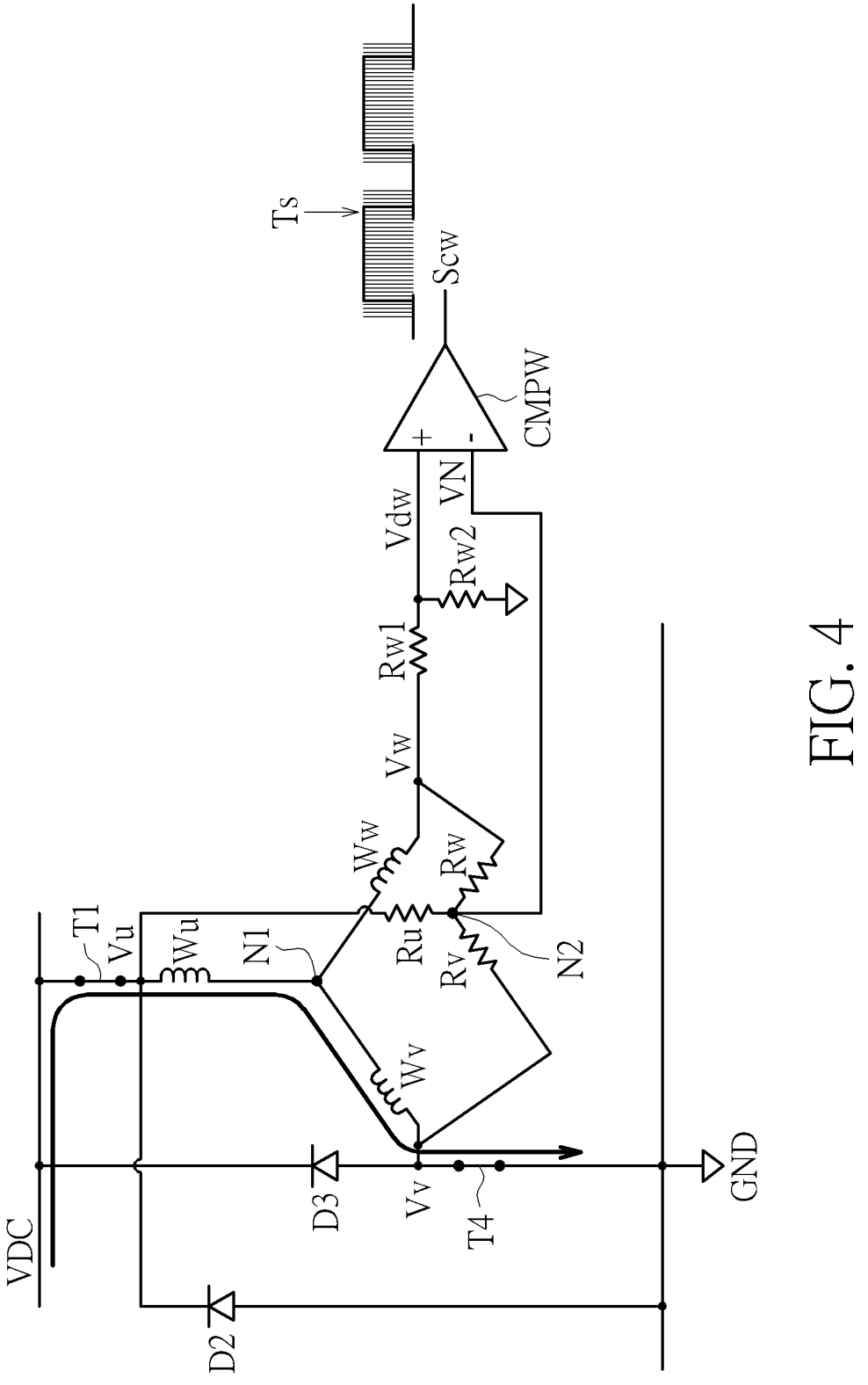
FIG. 4 is a schematic diagram illustrating sampling during the ON duration of the PWM voltage performed by the motor circuit in FIG. 1.

In other embodiments, if the duty cycle of the PWM voltage of the first winding is no less than the preset duty cycle, the control circuit 18 may establish the sampling time during the ON duration of the PWM voltage after the PWM voltage has stabilized. The preset duty cycle may be 50%. Since the comparison signal needs a predetermined amount of time to stabilize, when the duty cycle of the PWM voltage of the first winding is no less than 50%, the ON duration of the PWM voltage will be longer than or equal to the OFF duration of the PWM voltage, and thus, the control circuit 18 may determine that the sampling time occurs in the ON duration of the PWM voltage to ensure that the comparison signal has sufficient time to stabilize. In some embodiments, the sampling time may be the end time of the ON duration of the PWM voltage, enabling the comparison signal to have more time to stabilize, as shown in FIG. 4. FIG. 4 is a schematic diagram illustrating sampling during the ON duration of the PWM voltage performed by the motor circuit 1, in which the first winding is the winding Wu, the second winding is the winding Wv, the third winding is the winding Ww, and the duty cycle of the PWM voltage is 70%. Since the duty cycle of the PWM voltage is greater than the preset duty cycle (70%>50%), the control circuit 18 may set the sampling time Ts of the comparison signal Scw to the end time of the ON duration of the PWM voltage. That is, the sampling time Ts occurs just before the switch T1 switches from the ON state to the Off state, providing sufficient time for the comparison signal Scw to stabilize.

Then, the control circuit 18 may sample the comparison signal corresponding to the third winding at the sampling time Ts to detect the EBMF zero-crossing point. In some embodiments, the control circuit 18 may sample the comparison signal at the sampling time Ts to generate current sampled data. If the states of the current sampled data and the previous sampled data are different, it is determined that the EBMF zero-crossing point has been detected. For example, if the previous sampled data is the logic low level and the current sampled data is the logic high level, the control circuit 18 determines that the BEMF zero-crossing point has been detected. Once the BEMF zero-crossing point is detected, the control circuit 18 may control the driving circuit 10 to commutate the BLDC motor 14 after 30 degrees of electrical angle.

The voltage adjustment circuit 16 performs sampling after the comparison signal has stabilized to avoid adopting a filter, preventing the undesired phase delay in the BEMF signal resulting from adopting the filter while accurately detecting the BEMF zero-crossing point and reducing manufacturing costs.

In addition, the present invention is not limited to only one sampling in one PWM cycle, but may adopt multiple samplings after the comparison signal is stable.

FIG. 2 is a flowchart of a method 200 of operating the sensorless motor circuit 1. The method 200 includes Steps S202 to S214 to determine the sampling time of the comparison signal, providing accurate detection of the BEMF zero-crossing point while reducing the manufacturing costs. Any reasonable step change or adjustment is within the scope of the disclosure. Steps S202 to SS214 are detailed as follows:

Step S202: The driving circuit 10 outputs the PWM voltage to the first terminal of the first winding, couples the first terminal of the second winding to the ground terminal, and sets the first terminal of the third winding to the floating state;

Step S204: The voltage adjustment circuit 16 generates a divided voltage according to the terminal voltage of the third winding;

Step S206: The virtual neutral point circuit 12 generates the virtual neutral voltage VN;

Step S210: The comparator compares the divided voltage with the virtual neutral voltage VN to generate a comparison signal;

Step S212: The control circuit 18 determines the sampling time of the comparison signal according to the duty cycle of the PWM voltage;

Step S214: The control circuit 18 samples the comparison signal at the sampling time to detect the BEMF zero-crossing point.

The explanations for Steps S202 to S214 may be found in the preceding paragraphs, and will not be repeated here for brevity.

Since the method 200 performs sampling after the comparison signal has stabilized, the voltage adjustment circuit 16 does not need to adopt a filter, preventing the phase delay in the sensed BEMF signal while ensuring accurate detection of the BEMF zero-crossing point and reducing manufacturing costs.

Figure 5:
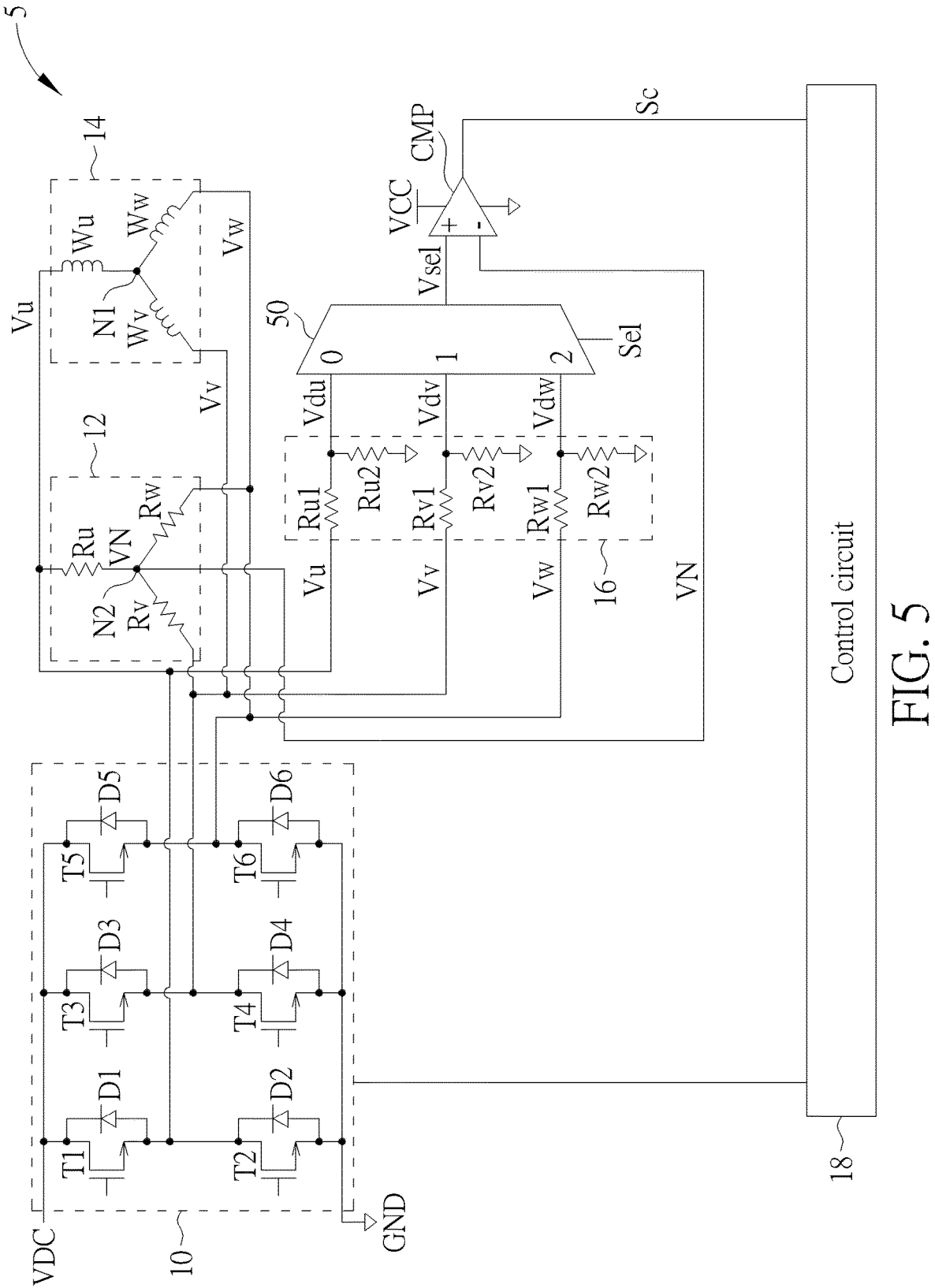
FIG. 5 is a circuit schematic of a sensorless motor circuit according to another embodiment of the invention.

FIG. 5 is a circuit schematic of a sensorless motor circuit 5 according to another embodiment of the invention. The motor circuit 5 and the motor circuit 1 are different in that the comparators CMPU, CMPV and CMPW in the motor circuit 1 are replaced by a multiplexer 50 and a comparator CMP in the motor circuit 5. The multiplexer 50 may be directly coupled to the voltage adjustment circuit 16. Other components in the motor circuit 5 are similar to those in the motor circuit 1, the explanations may be found in the preceding paragraphs and will not be repeated here. The explanations for the multiplexer 50 and the comparator CMP in the motor circuit 5 are provided as follows.

The multiplexer 50 includes a first input terminal directly coupled to the second terminal of the resistor Ru1 and configured to receive the divided voltage Vdu; a second input terminal directly coupled to the second terminal of the resistor Rv1 and configured to receive the divided voltage Vdv; a third input terminal directly coupled to the second terminal of the resistor Rw1 and configured to receive the divided voltage Vdw; a selection terminal configured to receive a selection signal Sel; and an output terminal configured to output a selected voltage Vsel. The comparator CMP includes a supply terminal configured to receive the supply voltage VCC; a ground terminal configured to receive the ground voltage GND; a non-inverting input terminal coupled to the output terminal of the multiplexer 50 and configured to receive the selected voltage Vsel; an inverting input terminal coupled to the virtual neutral point N2 and configured to receive the virtual neutral voltage VN; and an output terminal configured to output a comparison signal Sc.

The multiplexer 50 may select one of the divided voltage Vdu, the divided voltage Vdv and the divided voltage Vdw according to the selection signal Sel to serve as the selected voltage Vsel transmitted to the comparator CMP. The selection signal Sel may be generated by the control circuit 18 or other circuits, and may correspond to the third winding. For example, if the third winding is the winding Ww, the control circuit 18 may generate the selection signal Sel to select the divided voltage Vdw as the selected voltage Vsel. The comparator CMP may compare the selected voltage Vsel and the virtual neutral voltage VN to generate the comparison signal Sc. If the selected voltage Vsel exceeds the virtual neutral voltage VN, the comparator CMP may set the comparison signal Sc to the logic high level (e.g., the supply voltage VCC). If the selected voltage Vsel does not exceed the virtual neutral voltage VN, the comparator CMP may set the comparison signal Sc to the logic low level (e.g., the ground voltage GND).

The voltage adjustment circuit 16 performs sampling after the comparison signal has stabilized without adopting a filter, preventing the phase delay in the sensed BEMF signal while ensuring accurate detection of the BEMF zero-crossing point and reducing manufacturing costs.

Figure 6:
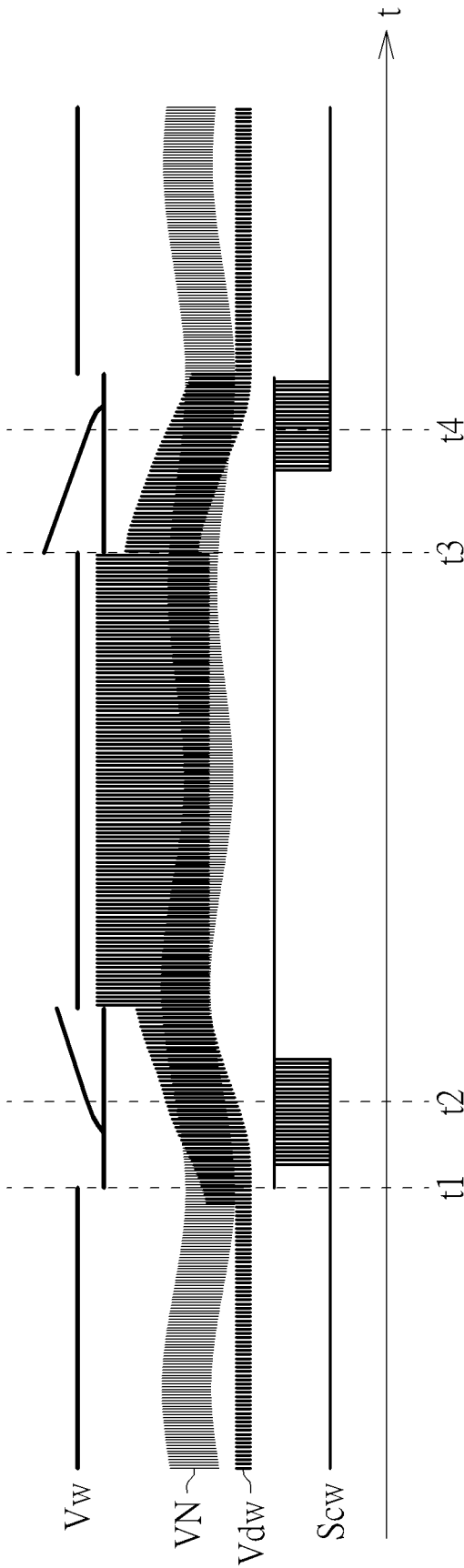
FIG. 6 shows waveforms of the motor circuit in FIG. 1.

FIG. 6 shows waveforms of the motor circuit 1, where the horizontal axis represents time and the vertical axis represents voltage. FIG. 6 shows the terminal voltage Vw, the divided voltage Vdw, the virtual neutral voltage VN and the comparison signal Scw.

At Time t1, the terminal voltage Vw begins floating, and the divided voltage Vdw is less than the virtual neutral voltage VN, thus the sampled data of the comparison signal Scw is the logic low level. Between Time t1 and Time t2, the terminal voltage Vw remains floating, and the divided voltage Vdw gradually increases but remains less than the virtual neutral voltage VN, and thus the sampled data of the comparison signal Scw remains at the logic low level. At Time t2, the divided voltage Vdw exceeds the virtual neutral voltage VN, thus the sampled data of the comparison signal Scw is the logic high level. Since the sampled data switches from the logic low level to the logic high level, the control circuit 18 determines that the EBMF zero-crossing point has been detected, and controls the driving circuit 10 according to the EBMF zero-crossing point to perform commutation of the BLDC motor 14 after 30 degrees of the electrical angle, setting the terminal voltage Vw to the PWM voltage.

At Time t3, the terminal voltage Vw begins floating, and the divided voltage Vdw exceeds the virtual neutral voltage VN, thus the sampled data of the comparison signal Scw is the logic high level. Between Time t3 and Time t4, the terminal voltage Vw remains floating, and the divided voltage Vdw gradually decreases but remains greater than the virtual neutral voltage VN, hence the sampled data of the comparison signal Scw remains at the logic high level. At Time t4, the divided voltage Vdw is less than the virtual neutral voltage VN, thus the sampled data of the comparison signal Scw is the logic low level. Since the sampled data switches from the logic high level to the logic low level, the control circuit 18 determines that the EBMF zero-crossing point has been detected, and controls the driving circuit 10 according to the EBMF zero-crossing point to perform commutation of the BLDC motor 14 after 30 degrees of the electrical angle, setting the terminal voltage Vw to the ground voltage GND.

Figure 7:
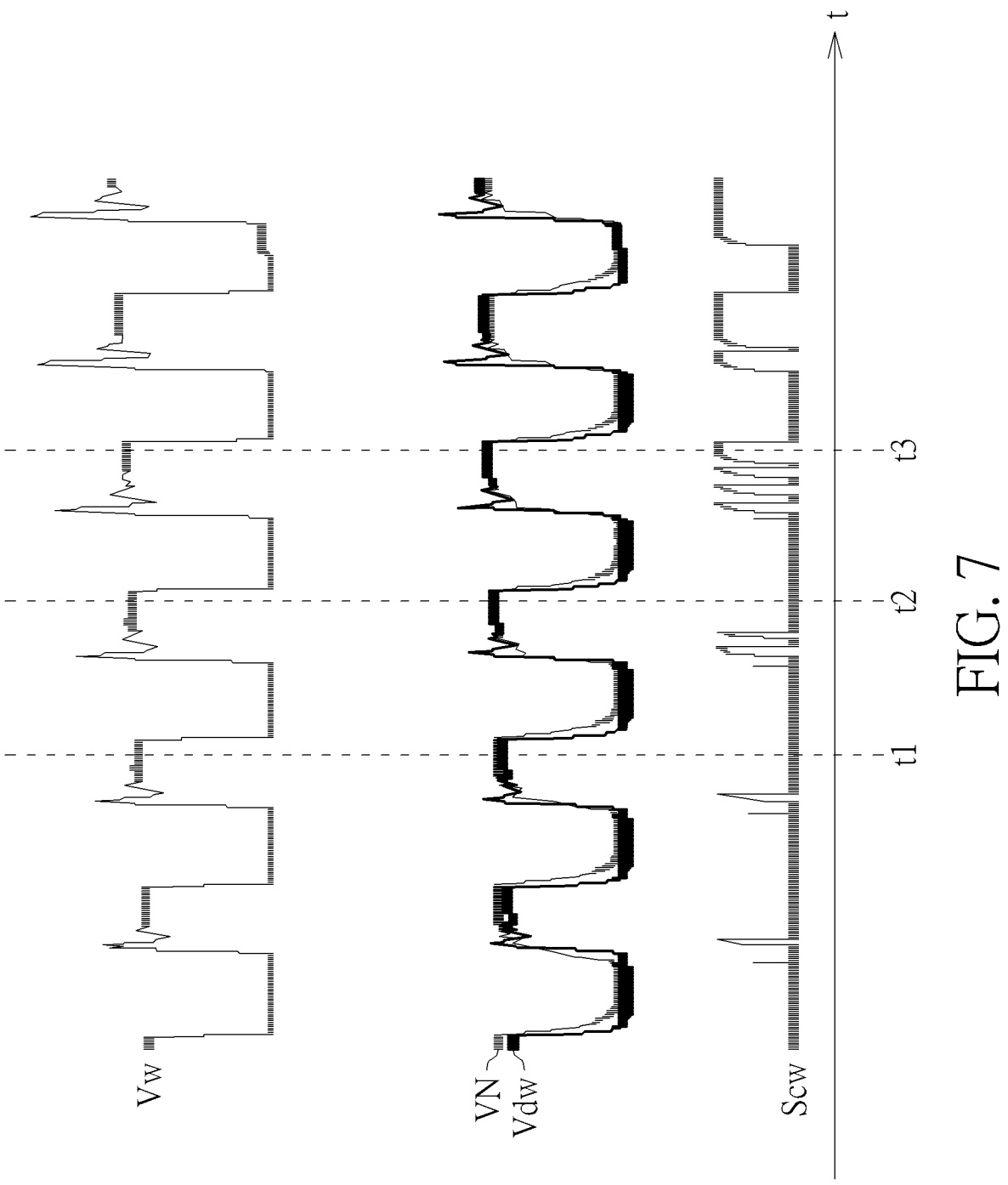
FIG. 7 shows enlarged waveforms in FIG. 6.

FIG. 7 shows enlarged waveforms of the motor circuit 1, where the horizontal axis represents time and the vertical axis represents voltage. FIG. 7 shows the terminal voltage Vw, the divided voltage Vdw, the virtual neutral voltage VN and the comparison signal Scw. Since the duty cycle of the PWM voltage is greater than the preset duty cycle, the control circuit 18 determines that the sampling time of the comparison signal Scw is the end time of the ON duration of the PWM voltage (i.e., the sampling times t1, t2 and t3).

At the sampling time t1, the divided voltage Vdw and the virtual neutral voltage VN have both stabilized, the control circuit 18 samples the comparison signal Scw and generates the logic low level as the sampled data. At the sampling time t2, the divided voltage Vdw and the virtual neutral voltage VN have both stabilized, the control circuit 18 samples the comparison signal Scw and generates the logic low level as the sampled data. At the sampling time t3, the divided voltage Vdw and the virtual neutral voltage VN have both stabilized, the control circuit 18 samples the comparison signal Scw and generates the sampled data at the logic high level. Since the state of the sampled data switches from the logic high level to the logic low level, the control circuit 18 determines that the EBMF zero-crossing point has been detected, and controls the driving circuit 10 according to the EBMF zero-crossing point to perform commutation of the BLDC motor 14 after 30 degrees of electrical angle.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A sensorless motor circuit comprising:
a brushless direct current (BLDC) motor comprising a first winding, a second winding and a third winding, each of the first winding, the second winding and the third winding comprising a first terminal having a terminal voltage, and a second terminal;
a driving circuit coupled to the BLDC motor and configured to output a pulse width modulation (PWM) signal to a first terminal of the first winding, couple a first terminal of the second winding to a ground terminal, and set a first terminal of the third winding to a floating state;
a voltage adjustment circuit coupled to the first terminal of the third winding and configured to generate a divided voltage according to a terminal voltage of the third winding;
a virtual neutral point circuit coupled to the first terminal of the first winding, the first terminal of the second winding and the first terminal of the third winding, and configured to generate a virtual neutral voltage;
a comparator coupled to the voltage adjustment circuit, directly coupled to the virtual neutral point circuit, and configured to compare the divided voltage with the virtual neutral voltage to generate a comparison signal; and
a control circuit directly coupled to the comparator, and configured to determine a sampling time of the comparison signal according to a duty cycle of the pulse width modulation signal, and sample the comparison signal at the sampling time to detect a back electromotive force (BEMF) zero-crossing point.

2. The sensorless motor circuit of claim 1, wherein if the duty cycle is less than a preset duty cycle, the control circuit determines that the sampling time occurs during an OFF duration of the PWM signal after the PWM signal has stabilized.

3. The sensorless motor circuit of claim 2, wherein the sampling time is an end time of the OFF duration of the PWM signal.

4. The sensorless motor circuit of claim 1, wherein if the duty cycle is not less than a preset duty cycle, the control circuit determines that the sampling time occurs during an ON duration of the PWM signal after the PWM signal has stabilized.

5. The sensorless motor circuit of claim 4, wherein the sampling time is an end time of the ON duration of the PWM signal.

6. The sensorless motor circuit of claim 1, wherein the control circuit samples the comparison signal at the sampling time to generate current sampled data, if the current sampled data and previous sampled data are different in state, determines that the BEMF zero-crossing point is detected.

7. The sensorless motor circuit of claim 1, wherein the comparator is directly coupled to the voltage adjustment circuit.

8. The sensorless motor circuit of claim 1, further comprising a multiplexer directly coupled to the voltage adjustment circuit and the comparator, and configured to send the divided voltage to the comparator according to a selection signal.

9. The sensorless motor circuit of claim 1, wherein the virtual neutral point circuit comprises:

a first virtual neutral point resistor comprising a first terminal coupled to the first terminal of the first winding, and a second terminal configured to generate the virtual neutral voltage;

a second virtual neutral point resistor comprising a first terminal coupled to the first terminal of the second winding, and a second terminal coupled to the second terminal of the first virtual neutral point resistor; and a third virtual neutral point resistor comprising a first terminal coupled to the first terminal of the third winding, and a second terminal coupled to the second terminal of the first virtual neutral point resistor.

10. A method of operating a sensorless motor circuit, the sensorless motor circuit comprising a BLDC motor, a driving circuit, a voltage adjustment circuit, a virtual neutral point circuit, a comparator and a control circuit, the BLDC motor comprising a first winding, a second winding and a third winding, each of the second winding and the third winding comprising a first terminal having a terminal voltage, and a second terminal, the driving circuit being coupled to the BLDC motor, the voltage adjustment circuit being coupled to a first terminal of the third winding, and the virtual neutral point circuit being coupled to a first terminal of the first winding, a first terminal of the second winding and a first terminal of the third winding, the comparator being coupled to the voltage adjustment circuit and directly coupled to the virtual neutral point circuit, the control circuit being directly coupled to the comparator, the method comprising:

the driving circuit outputting a PWM signal to a first terminal of the first winding, coupling a first terminal of the second winding to a ground terminal, and setting the first terminal of the third winding to a floating state;

the voltage adjustment circuit generating a divided voltage according to a terminal voltage of the third winding;

the virtual neutral point circuit generating a virtual neutral voltage;

the comparator comparing the divided voltage with the virtual neutral voltage to generate a comparison signal;

the control circuit determining a sampling time of the comparison signal according to a duty cycle of the PWM signal; and the control circuit sampling the comparison signal at the sampling time to detect an EBMF zero-crossing point.

11. The method of claim 10, wherein the control circuit determining the sampling time of the comparison signal according to the duty cycle of the PWM signal comprises:

if the duty cycle is less than a preset duty cycle, the control circuit determining that the sampling time occurs during an OFF duration of the PWM signal after the PWM signal has stabilized.

12. The method of claim 11, wherein the sampling time occurs at an end time of the OFF duration of the PWM signal.

13. The method of claim 10, wherein the control circuit determining the sampling time of the comparison signal according to the duty cycle of the PWM signal comprises:

if the duty cycle is not less than a preset duty cycle, the control circuit determining that the sampling time occurs during an ON duration of the PWM signal after the PWM signal has stabilized.

14. The method of claim 13, wherein the sampling time occurs at an end time of the ON duration of the PWM signal.

15. The method of claim 10, wherein the control circuit sampling the comparison signal at the sampling time to detect the EBMF zero-crossing point comprises:

the control circuit sampling the comparison signal at the sampling time to generate current sampled data; and if the current sampled data and previous sampled data are different in state, determining that the BEMF zero-crossing point is detected.

16. The method of claim 10, wherein the sensorless motor circuit further comprises a multiplexer directly coupled to the voltage adjustment circuit and the comparator, and the method further comprises the multiplexer sending the divided voltage to the comparator according to a selection signal.

* * * * *